No. 705,151. Patented July 22, 1902.
C. A. SMITH.
THILL COUPLING.
(Application filed Aug. 26, 1901.)
(No Model.)
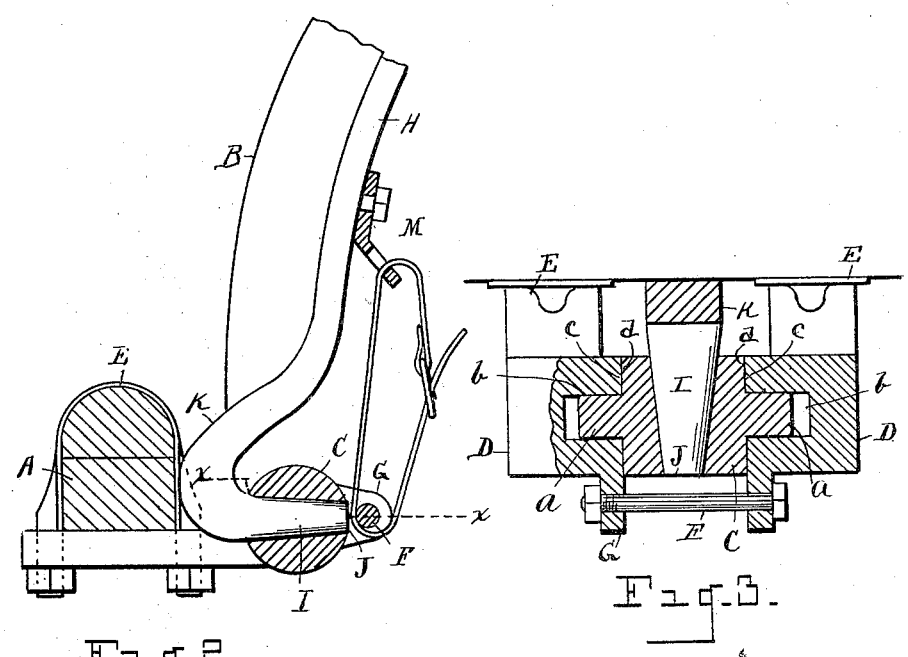
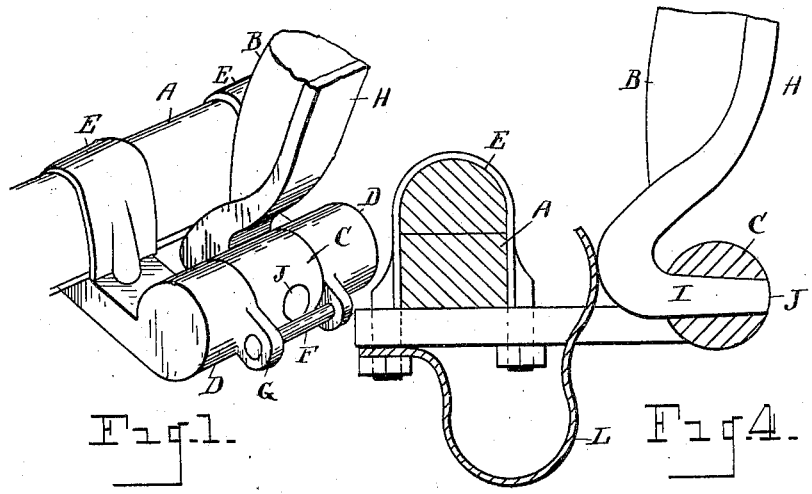
WITNESSES
INVENTOR.
Charles A. Smith.
By
Attorneys.

UNITED STATES PATENT OFFICE.

CHARLES A. SMITH, OF PINCKNEY, MICHIGAN.

THILL-COUPLING.

SPECIFICATION forming part of Letters Patent No. 705,151, dated July 22, 1902.

Application filed August 26, 1901. Serial No. 73,388. (No model.)

*To all whom it may concern:*

Be it known that I, CHARLES A. SMITH, a citizen of the United States, residing at Pinckney, in the county of Livingston and State of Michigan, have invented certain new and useful Improvements in Thill-Couplings, of which the following is a specification, reference being had therein to the accompanying drawings.

The invention relates to thill-couplings; and it is the object of the invention to obtain a construction in which the thills may be quickly attached or detached and when in position will be firmly held from disengagement.

A further feature of the improvement is that all rattling of parts is prevented and wear is automatically taken up.

The invention consists in the construction as hereinafter described and claimed.

In the drawings, Figure 1 is a perspective view of the thill-coupling. Fig. 2 is a longitudinal section therethrough. Fig. 3 is a horizontal section on line $x\ x$, Fig. 2. Fig. 4 is a sectional elevation illustrating a modification.

A is the vehicle-axle, and B is one of the shafts or thills. Arranged in front of the axle is a rotary or swiveled head C. This head is journaled in bearings D, secured to the axle preferably by clips, such as E. The head C is preferably provided with oppositely-extending pintles $a$, which engage with sockets $b$, formed in the bearings D, while surrounding said sockets are the adjacent faces $c$ and $d$, respectively upon the bearing and head.

F is a clamping-bolt which engages with ears G, formed upon the bearings D, and is adapted to draw said bearings together, so as to take up any wear on the faces $c$ and $d$.

H is thill-iron bolted or otherwise secured to the thill D. The end of this iron is formed into a hook I, which in the normal position of the thills will extend in a substantially horizontal plane. This hook is adapted to engage a corresponding socket J, formed in the head C, and in order to form firm connection therewith the hook and socket are preferably tapered, as shown.

With the construction as thus far described the thill may be secured to the vehicle by engaging the hooks I with the sockets J in the swiveled heads C, and this may be accomplished by first lowering the forward ends of the thills, so as to bring the hook into the inclined position shown in dotted lines in Fig. 2. As soon, however, as the hook is thus engaged and the forward ends of the thills are raised the bent portion K of the hook will come into close proximity to the forward side of the axle A. This will prevent accidental disengagement of the hook from the socket and will also form an abutment against which the hooks bear in backing.

If desired, in place of arranging the hook in proximity to the axle A it may be placed farther forward and a spring, such as L, interposed between the hook and the axle, which spring may be secured to the clip E, as shown. With this construction the spring L will serve to hold the hook in engagement with its socket when the thills are in normal position and at the same time will permit of disengagement whenever the thills are dropped.

If it is desired to use a safety-strap in connection with the coupling, this may be secured by passing it around the bolt F and also engaging with an eye M, which is bolted to the thill. This strap is, however, unnecessary, as the hooks when once in engagement with the swivel-head cannot become detached without lowering the thills.

What I claim as my invention is—

1. A thill-coupling comprising a swivel-head having a socket formed centrally therethrough in the plane of the axis and a hook secured to the thill adapted to engage said socket.

2. A thill-coupling comprising a pair of cleats separately secured to the axle and having separate forwardly-projecting apertured arms, a socketed head having pintles engaging the apertures in said arms, a hook secured to the thill for engaging said socket and a clamping-bolt for drawing upon said arms to press the same against said swivel-head.

3. A thill-coupling comprising separated forwardly-projecting bearings clipped to the axle a rotary socketed head having pintles at opposite ends for engaging said bearings, a clamping-bolt for drawing said bearings together, a thill having a hook for engaging the socket in said head and a safety-strap secured to said thill and looping around said clamping-bolt.

In testimony whereof I affix my signature in presence of two witnesses.

CHARLES A. SMITH.

Witnesses:
WARREN A. CARR,
G. W. TEEPLE.